US009699699B1

(12) United States Patent
Oroskar et al.

(10) Patent No.: US 9,699,699 B1
(45) Date of Patent: Jul. 4, 2017

(54) CONSIDERATION OF CARRIER CHARACTERISTICS WHEN PROVIDING CARRIER AGGREGATION SERVICE

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/939,227

(22) Filed: Nov. 12, 2015

(51) Int. Cl.
| H04W 36/00 | (2009.01) |
| H04W 36/14 | (2009.01) |
| H04W 16/14 | (2009.01) |
| H04W 24/02 | (2009.01) |
| H04W 72/04 | (2009.01) |
| H04W 36/30 | (2009.01) |
| H04W 92/10 | (2009.01) |

(52) U.S. Cl.
CPC ........... *H04W 36/14* (2013.01); *H04W 16/14* (2013.01); *H04W 24/02* (2013.01); *H04W 36/30* (2013.01); *H04W 72/0406* (2013.01); *H04W 72/0453* (2013.01); *H04W 92/10* (2013.01)

(58) Field of Classification Search
CPC .. H04W 36/0055; H04W 36/06; H04W 36/30

USPC .......................................................... 455/436
See application file for complete search history.

(56) References Cited

U.S. PATENT DOCUMENTS

| 2009/0069043 | A1* | 3/2009 | Roh ...................... H04W 52/42 455/522 |
| 2010/0177654 | A1* | 7/2010 | Charbit ................ H04B 1/7087 370/252 |
| 2011/0117916 | A1* | 5/2011 | Dahlen .................. H04W 48/02 455/436 |
| 2012/0115468 | A1 | 5/2012 | Lindoff et al. |
| 2013/0150055 | A1* | 6/2013 | Laroia ................... H04W 16/12 455/443 |
| 2013/0223410 | A1* | 8/2013 | Karlsson ............... H04L 5/0007 370/332 |
| 2015/0036519 | A1* | 2/2015 | Kazmi ...................... H04L 5/00 370/252 |
| 2015/0148090 | A1* | 5/2015 | Shimomura .......... H04W 16/14 455/515 |

* cited by examiner

*Primary Examiner* — Timothy Pham

(57) ABSTRACT

In an example method, a base station encounters a trigger to begin providing carrier aggregation service to a UE. The base station is serving the UE on a first carrier, and makes a determination that the first carrier is a carrier having an uplink transmission power restriction rather than a carrier that does not have the uplink transmission power restriction. Responsive to encountering the trigger: based at least on the determination, the base station initiates a handover of the UE from the first carrier to a second carrier that does not have the uplink transmission power restriction; and the base station providing the UE with the carrier aggregation service, using the second carrier as a primary carrier during the carrier aggregation service.

20 Claims, 4 Drawing Sheets

CONSIDERATION OF CARRIER CHARACTERISTICS WHEN PROVIDING CARRIER AGGREGATION SERVICE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs, such as one or more control channels for carrying control signaling and one or more traffic signals for carrying application-layer data and other traffic.

In accordance with the Long Term Evolution (LTE) standard of the Universal Mobile Telecommunications System (UMTS), for instance, the air interface is divided over time into frames and subframes, with each subframe having two time slots. Further, the uplink and downlink channels are each divided over their frequency bandwidth into subcarriers that are grouped within each slot into resource blocks. When a UE is positioned within coverage of a base station in such a system, the UE may register or "attach" with the base station on a particular carrier on which the base station is configured to schedule particular downlink and uplink resource blocks to carry data communications to and from the UE.

A recent revision of LTE known as LTE-Advanced now permits a base station to serve a UE with "carrier aggregation," by which the base station schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers.

When a base station provides a UE with carrier aggregation service, each aggregated carrier is referred to as a "component carrier." In addition, one of the carriers may be deemed to be a "primary carrier" or "primary cell" (PCell) and each other carrier may be deemed to be a "secondary carrier" or "secondary cell" (SCell). In some scenarios, communication of control signaling associated with the bearer data may occur on a control channel of the PCell, whereas communication of bearer data may occur on the traffic channels of the PCell and one or more SCells.

In some wireless marketplaces, multiple wireless service providers may coexist, with each wireless service provider providing a wireless communication system. Each wireless service provider may be licensed by a regulatory agency to operate in one or more distinct, non-overlapping regions, or "bands", of the radio frequency (RF) spectrum. For instance, in the United States, the Federal Communications Commission (FCC) holds regulatory authority over the RF spectrum for this purpose. Among the concerns and issues relating to operating in different regions of the RF spectrum is minimization and/or avoidance of RF emission "leaking" into one band due to transmissions originating from an adjacent or nearby band. To address this concern, a regulatory agency, such as the FCC, may set one or more requirements specifying allowable levels of power leakage for certain bands, while not necessarily prescribing how to achieve the specified levels. As one example, the FCC may require UEs operating on carriers that are in close proximity to emergency bands or the like to attenuate their uplink transmission power. Various design and engineering standards may be devised that specify procedures and protocols aimed (possibly among other purposes) at meeting such requirements.

One approach to controlling RF emission leakage is to implement an operational protocol by which a base station may signal to UEs in its coverage area an instruction or notification to attenuate their respective uplink transmission powers under certain circumstances, such as when operating on carriers in close proximity to emergency bands or the like. By way of example, in an LTE system, a base station may provide a network signaling (NS) value to UEs being served by the base station, and the NS value may correspond to an amount by which the UEs should attenuate their uplink transmission power. In one example configuration, for UEs operating on carriers where specific FCC requirements do not apply, the base station may provide, by default, a NS_01 value corresponding to zero attenuation. Accordingly, the UEs operating on those carriers may operate using a default maximum uplink transmission power. On the other hand, for UEs operating on carriers where specific FCC requirements do apply, the base station may provide a different NS value, such as an NS_03 value, an NS_04 value, or an NS_06 value, corresponding to a particular amount of attenuation (e.g., 3 dB, 5 dB, 10 dB, etc.) by which UEs should reduce their default maximum transmission power.

OVERVIEW

As discussed above, in a wireless communication system in which a base station provides a coverage area in which to serve UEs, with the coverage area operating on a plurality of carriers, a base station may direct some of the served UEs to attenuate their respective uplink transmission powers to below a default maximum transmission power, but permit other UEs to operate at the default maximum transmission power. In particular, the base station may direct UEs operating on particular carriers of the plurality of carriers to attenuate their respective uplink transmission powers due to FCC requirements, but permit UEs operating on other carriers of the plurality of carriers to operate without having to attenuate their respective uplink transmission powers due to FCC requirements.

A problem that can arise with this arrangement, however, is that the effective scope or footprint of the coverage area may be limited for the UEs operating on the particular carriers as compared to the scope or footprint of the coverage area for the UEs operating on the other carriers. For instance, consider a scenario in which all UEs are configured to operate using a default uplink transmission power and a base station directs UEs operating on the particular carriers to attenuate their uplink transmission power by 3 dB (i.e. 50%). In this scenario, a first UE operating on one of the particular carriers would be able to communicate with a base station using a first uplink transmission power that is half of a default uplink transmission power, whereas a second UE operating on one of the other carriers would be able to communicate with the base station using the default uplink transmission power. The maximum distance from a base station at which a UE may successfully transmit data to the base station is a function of uplink transmission power, among other factors. Consequently, the first UE might not be able to communicate on the uplink with the base station as far away from the base station as the second UE can communicate on the uplink, thereby limiting the scope of the coverage area in which the first UE may operate. Such a limited coverage area can, in turn, introduce more handovers than normal, leading to increased control signaling and other undesirable conditions.

In light of this problem, in some situations, operating on carriers on which UEs do not have to attenuate their uplink transmission powers below a default maximum transmission power due to FCC requirements, or uplink-transmission-unrestricted (UTU) carriers, may be more desirable than operating on uplink-transmission-restricted (UTR) carriers, carriers on which UEs have to attenuate their uplink transmission power restrictions to below a default maximum transmission power due to FCC requirements. This may be particularly the case in an LTE carrier aggregation scenario. For example, UTU carriers may be better suited than UTR carriers for use as primary carriers, since the primary carriers carry uplink control signaling during carrier aggregation. Conversely, UTU carriers and UTR carriers may be equally suitable for use as secondary carriers, since the secondary carriers may mainly carry downlink traffic.

Unfortunately, however, when a base station encounters a trigger to begin providing a UE with carrier aggregation service, the base station may be arranged by default to provide the carrier aggregation service by using a carrier on which the UE is already being served as the primary carrier, i.e., the carrier on which the control signaling occurs, and adding one or more other carriers as secondary carriers. This can lead to undesirable conditions when a base station is serving a UE on a UTR carrier and encounters a trigger to begin providing carrier aggregation service. For instance, when a base station is serving a UE on a UTR carrier and the base station encounters a trigger to begin providing the UE with carrier aggregation service, the base station may use the UTR carrier as the primary carrier and add one or more other carriers as a secondary carrier, even though it may be more desirable to use a UTU carrier as the primary carrier for the reasons discussed above.

Disclosed herein are methods and corresponding systems to help overcome this issue by purposely trying to avoid using UTR carriers as primary carriers during carrier aggregation service. In accordance with the disclosure, when a UE is being served by a base station on a UTR carrier and the base station encounters a trigger to begin providing carrier aggregation service, because the base station is serving the UE on a UTR carrier rather than a UTU carrier, the base station may transition the UE to being served by the base station on a UTU carrier. The base station may then provide carrier aggregation service to the UE, using the UTU carrier as the primary carrier during the carrier aggregation service. Advantageously, during the carrier aggregation service, at least some control signaling with the UE may then occur on the UTU carrier rather than the UTR carrier.

By way of example, a base station that is serving a UE on a first carrier may encounter a trigger to begin providing carrier aggregation service to a UE. Further, the base station may determine whether or not the first carrier is a UTR carrier. If the first carrier is a UTR carrier, the base station may responsively initiate a handover of the UE from the first carrier to a second carrier that is a UTU carrier and then provide the UE with carrier aggregation service, using the second carrier as the primary carrier during the carrier aggregation service. On the other hand, if the first carrier is not a UTR carrier, the base station may provide the UE with the carrier aggregation service by using the first carrier as the primary carrier, rather than initiating a handover of the UE to a different carrier. In this manner, when the base station provides a coverage area that operates on both UTU and UTR carriers, the base station can avoid using the UTR carriers as primary carriers when providing UEs with carrier aggregation service.

As another example, a base station that is serving a UE on a first carrier may encounter a trigger to begin providing carrier aggregation service to a UE. Further, the base station may determine that the first carrier is a UTR carrier. In this situation, responsive to the encountering of the trigger, the base station may carry out certain functions. For instance, based at least on the determination that the first carrier is one of the UTR carriers, the base station may add a second carrier that is a UTU carrier as a secondary carrier and then switch the primary carrier and the secondary carrier, such that the UTU carrier becomes the primary carrier and the UTR carrier becomes the secondary carrier. With this configuration, the base station may then provide the carrier aggregation service to the UE.

In some examples, a base station may use different uplink-attenuation parameters to specify different levels of restriction that served UEs should apply to their uplink transmission powers. For instance, LTE defines different NS values corresponding to different uplink transmission power levels. In an LTE system, each carrier that the coverage area operates on may correspond to a respective NS value, and the base station may have access to a database storing data that maps NS values to respective carriers. With this arrangement, the base station may distinguish between UTR carriers and UTU carriers based on the NS values corresponding to each of the carriers. For example, the base station may determine that a particular carrier is a UTR carrier by determining that the particular carrier corresponds to a particular NS value, such as an NS_04 value. Or the base station may determine that a particular carrier is a UTU carrier by determining that the particular corresponds to a different NS value, such as an NS_01 value.

Accordingly, in one respect, disclosed is a method operable in a wireless communication system in which a base station provides a coverage area in which to serve UEs, with the coverage area operating on a plurality of carriers each defining one or more ranges of frequency spectrum. One or more particular carriers of the plurality of carriers are UTR carriers having an uplink transmission power restriction and other carriers of the plurality of carriers are UTU carriers that do not have the uplink transmission power restriction. According to the method, the base station encounters a trigger to being providing carrier aggregation service to a UE that the base station is serving. The base station is serving the UE on a first carrier of the plurality of carriers, and the base station makes a determination that the first carrier is one of the UTR carriers having the uplink transmission power restriction rather than one of the UTU carriers that do not have the uplink transmission power restriction. Responsive to the encountering of the trigger, the base station performs various operations. In particular, based at least on the determination that the first carrier is one of the UTR carriers having the uplink transmission power restriction, the base station initiates a handover of the UE from the first carrier to a second carrier of the plurality of carriers that is a UTU carrier; and the base station provides the UE with the carrier aggregation service, with the base station using the second carrier as a primary carrier during the carrier aggregation service.

In another respect, disclosed is another method operable in a wireless communication system in which a base station provides a coverage area in which to serve UEs, with the coverage area operating on a plurality of carriers each defining one or more ranges of frequency spectrum. One or more particular carriers of the plurality of carriers are UTR carriers having an uplink transmission power restriction and other carriers of the plurality of carriers are UTU carriers that do not have the uplink transmission power restriction. According to the method, the base station encounters a trigger to being providing carrier aggregation service to a UE that the base station is serving. The base station is serving the UE on a first carrier of the plurality of carriers, and the base station makes a determination of whether or not the first carrier is one of the UTR carriers having the uplink transmission power restriction. And responsive to the encountering of the trigger, the base station performs various operations depending on whether or not the first carrier is one of the UTR carriers having the uplink transmission power restriction. In particular, if the determination is that the first carrier is one of the UTR carriers having the uplink transmission power restriction, then the base station: (i) initiates a handover of the UE from the first carrier to a second carrier of the plurality of carriers that is a UTU carrier and (ii) provides the UE with the carrier aggregation service by using the second carrier as the primary carrier. Whereas, if the determination is that the first carrier is not one of the UTR carriers having the uplink transmission power restriction, then the base station provides the UE with the carrier aggregation service by using the first carrier as the primary carrier, rather than initiating the handover of the UE from the first carrier to the second carrier.

In still another respect, disclosed is a base station. The base station includes an antenna structure that radiates to define a coverage area for serving UEs, with the coverage area operating on a plurality of carriers each defining on or more ranges of frequency spectrum. One or more particular carriers of the plurality of carriers are UTR carriers having an uplink transmission power restriction and one other carriers of the plurality of carriers are UTU carriers that do not have the uplink transmission power restriction. The base station further includes a controller comprising at least one processing unit, data storage, and program instructions stored in the data storage and executable by the processing unit to carry out various operations. In particular, the operations include encountering a trigger to begin providing carrier aggregation service to a UE that the base station is serving, with the base station serving the UE on a first carrier of the plurality of carriers, and making a determination that the first carrier is one of the UTR carriers having the uplink transmission power restriction rather than one of the UTU carriers that do not have the uplink transmission power restriction. Further, the operations include responsive to the encountering of the trigger: (i) based at least on the determination that the first carrier is one of the UTR carriers having the uplink transmission power restriction, transitioning the UE to being served on a second carrier of the plurality of carriers that is a UTU carrier; and (ii) providing the UE with the carrier aggregation service, with the base station using the second carrier as a primary carrier during the carrier aggregation service.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols, such as Code Division Multiple Access (CDMA) (e.g., 1×RTT and 1×EV-DO) or Global System for Mobile Communications (GSM), among other possibilities. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
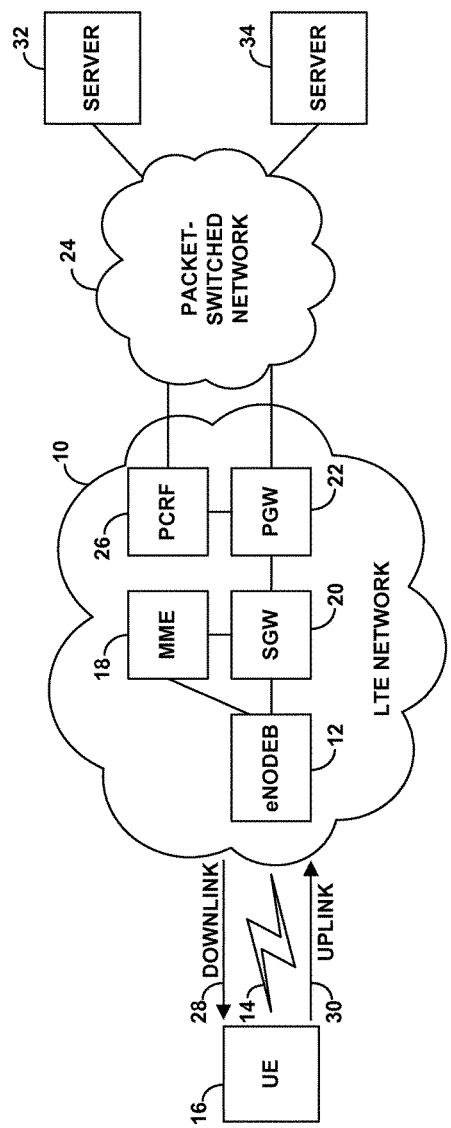
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network includes a representative LTE base station (evolved Node-B (eNodeB)) 12, which would have an antenna structure and associated equipment for providing an LTE coverage area 14 in which to serve UEs such as an example UE 16 as shown.

The UEs may take various forms, such as any of those noted above, whether or not operated by a human "user". Further, the eNodeB could also take various forms. By way of example, the eNodeB could be a macro base station of the type typically provided by a wireless service provider with a tower mounted antenna structure and associated equipment. Or the eNodeB could be a small cell base station (such as a femtocell, picocell, or the like) typically provided to help improve coverage within macro cell coverage and usually having a much smaller form factor and coverage range than a macro base station.

As further shown in the example arrangement of FIG. 1, the eNodeB has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. Still further, the LTE network includes a representative policy server shown as a Policy Charging and Rules Function (PCRF) 26, with which the PGW is configured to communicate in order to authorize serving of UEs, such as to determine whether to establish particular bearers with UEs and/or what service policy rules to apply on various carriers with respect to those bearers. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 28 from the eNodeB to the UE and an uplink direction 30 from the UE to the eNodeB. Further, the eNodeB and UE may be configured (e.g., licensed and programmed) to support air interface communication on various particular carriers, which may be frequency division duplex (FDD) or time division duplex (TDD). Each such carrier and/or its particular downlink and uplink channels may be identified by one or more globally unique identifiers per industry standard, so that the eNodeB and a served UE can refer to particular carriers by those identifiers.

Further, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect the eNodeB's coverage on a particular carrier, and the UE may engage in an attach process or handover process to register with the LTE network on that carrier. For instance, the UE may initially transmit to the eNodeB an attach request, which the eNodeB may pass along to the MME 18, triggering a process of authenticating the UE and establishment of one or more logical bearer connections for the UE between the eNodeB and the PGW 22.

Further, the UE may engage in signaling with the eNodeB to establish a radio-link-layer connection (i.e., air interface connection) on the detected carrier, so that the eNodeB may then serve the UE on that carrier. For instance, the UE and eNodeB may exchange radio-resource-control (RRC) configuration messaging in order to prepare the eNodeB to serve the UE on the carrier and to prepare the UE to be served on the carrier. In this process, the eNodeB may store a context record for the UE, indicating that the eNodeB is serving the UE on the particular carrier, so that the eNodeB may then serve the UE on the indicated carrier (e.g., then exchanging control signaling and bearer traffic with the UE on that carrier) per that context record. Further, the UE may store a context record indicating that the UE is being served on that carrier, so that the UE can then be served on that carrier (e.g., then exchanging control signaling and bearer traffic with the eNodeB on that carrier) per that context record.

In line with the discussion above, different wireless service providers may be licensed to operate in one or more distinct bands within the RF portion of the electromagnetic spectrum. In an LTE system, within the different bands, non-overlapping carriers are allocated to service providers in different RF ranges spanning 1.4 MHz, 3 MHz, 5 MHz, 10 MHz, 15 MHz, or 20 MHz. Further, within a given band, carriers may be arranged contiguously in frequency, such that any two adjacent carriers are separated by a common band edge. One consequence of this arrangement is that transmission power near the edge of one carrier can "leak" into the adjacent carrier across the common edge between the two carriers. Such power leakage can result in interference and correspondingly some degree of service degradation. Power leakage from one defined band to another may be referred to as out of band emission (OOBE).

Further in line with the discussion above, one or more techniques may be implemented in a wireless communication system to help control or reduce leakage and/or its effects. For instance, on the uplink, UEs may be configured to modify or adapt their respective transmission powers in response to one or more control messages received from a base station. As a particular example, in LTE, one approach to controlling OOBE is to cause UEs in the coverage area of an eNodeB to reduce their respective transmission powers in accordance with one or more directives from the eNodeB. LTE defines a maximum power reduction (MPR) value that prescribes one or more default power levels that a UE may use in transmission. In order to meet regulatory OOBE requirements, LTE also defines additional-MPR (A-MPR) values that UEs may be directed to apply in order to further reduce transmission power when necessary. Typically, A-MPR values specify a power attenuation value in units of decibels (e.g., 3 dB, 5 dB, 10 dB, etc.).

An eNodeB may use different uplink-attenuation parameters to specify different levels of restriction that served UEs should apply to their uplink transmission powers. For example, as discussed above, LTE defines different NS values corresponding to different uplink transmission power levels. In particular, LTE defines an NS_01 value to correspond to a default MPR and other NS values, such as an NS_03 value, an NS_04 value, and an NS_06 value, to correspond to respective A-MPR values. An eNodeB may store or have access to a database storing data that maps NS values to respective carriers. When serving a UE on a particular carrier, the eNodeB may refer to the database to determine an NS value corresponding to the particular carrier, and provide the determined NS value to the UE in a control message.

In one example configuration, an eNodeB may provide an NS_01 value to UEs operating on carriers where OOBE requirements do not apply, and the UEs may interpret the NS_01 value as a directive for the UEs to use the default MPR. Further, the eNodeB may provide a different NS value, such as an NS_04 value, to UEs operating on carriers where OOBE requirements do apply, and the UEs may interpret the NS_04 value as a directive for the UEs to apply an A-MPR corresponding to the NS_04 value. The NS values can thus serve to define OOBE levels that UEs should meet, and to define A-MPR values to apply in order to meet the OOBE levels. In addition, carriers can thus be referred to by the respective NS value specified for the carrier (e.g., NS_01 carriers, NS_04 carriers, etc.). An NS_04 carrier is therefore one example of a UTR carrier having an uplink transmission power restriction due to FCC or other regulatory requirements. Similarly, an NS_01 carrier is an example of a UTU carrier that does not have an uplink transmission power restriction due to FCC or other regulatory requirements.

As further noted above, when an eNodeB provides a coverage area that operates on both UTU carriers and UTR carriers, for UEs operating on UTR carriers, the effective scope or footprint of the coverage area may be limited as compared to the scope or footprint of the coverage area for UEs operating on UTU carriers. Such a limited coverage area can lead to issues such as those noted above, and in some instances, make operating on UTU carriers more desirable than operating on UTR carriers. By way of example, when providing carrier aggregation service, UTU carriers may be better suited than UTR carriers for use as primary carriers, since the primary carriers carry uplink control signaling during carrier aggregation. Conversely, UTU carriers and UTR carriers may be equally suitable for use as secondary carriers, since the secondary carriers may mainly carry downlink traffic.

Unfortunately, however, when a base station encounters a trigger to begin providing a UE with carrier aggregation service, the base station may be arranged by default to provide the carrier aggregation service by using a carrier on which the UE is already being served as the primary carrier, i.e., the carrier on which the control signaling occurs, and adding one or more other carriers as secondary carriers. This default arrangement can lead to undesirable conditions, such as the base station using a UTR carrier as the primary carrier and adding one or more other carriers as a secondary carrier, even though it may be more desirable to use a UTU carrier as the primary carrier for the reasons discussed above.

To help address this issue, the present disclosure provides a technique for an eNodeB to attempt to avoid using UTR carriers as primary carriers during carrier aggregation service. In accordance with the present disclosure, a base station may be serving a UE on a UTR carrier and the base station may encounter a trigger to begin providing carrier aggregation service. Because the base station is serving the UE on a UTR carrier rather than a UTU carrier, the base station may responsively transition the UE to being served by the base station on a UTU carrier. The base station may then provide carrier aggregation service to the UE, using the UTU carrier as the primary carrier during the carrier aggregation service.

In practice, for instance, eNodeB 12 may be serving UE 16 on a first carrier. For example, the first carrier may be a UTU carrier such as NS_01 carrier or may be a UTR carrier such as an NS_04 carrier. Further, eNodeB 12 may encounter a trigger to begin providing carrier aggregation service to UE 16. In particular, during an initial attach process and/or later while serving the UE, the eNodeB may encounter a trigger to arrange the UE's radio-link-layer connection to encompass two or more carriers so as to facilitate carrier aggregation service.

The trigger to begin providing the UE with carrier aggregation service could take various forms. By way of example, the eNodeB may determine that the first carrier on which the UE is being served is threshold heavily loaded (e.g., that the eNodeB has been scheduling more than a threshold percentage of resources on that carrier, and/or that the eNodeB is serving more than a threshold number of UEs with radio-link-layer connections encompassing that carrier). Or the eNodeB may determine that the air interface channel conditions between the UE and the eNodeB are threshold good and/or threshold poor (e.g., based on UE-provided channel-quality measurement reports and/or eNodeB evaluation of channel quality). Still further, the eNodeB may determine that there is a threshold great extent of data buffered for transmission over the air interface between the eNodeB and the UE.

As another example, encountering the trigger may include determining that a UE is configured to engage in carrier aggregation. Depending on the desired implementation, a UE may be configured to engage in carrier aggregation or not configured to engage in carrier aggregation. The UE may indicate to the eNodeB, e.g., during RRC configuration messaging, whether or not the UE is configured to engage in carrier aggregation. And the eNodeB may determine, based on the indication, whether or not the UE is configured to engage in carrier aggregation.

The eNodeB 12 may also make a determination of whether or not the first carrier is a UTR carrier or is instead a UTU carrier. By way of example, the eNodeB may determine a global identifier of the first carrier, and refer to a database mapping carriers to NS values to determine an NS value corresponding to the first carrier. If the NS value is an NS_01 value, the eNodeB may interpret the NS_01 value as meaning that the first carrier is a UTU carrier. On the other hand, if the NS value is an NS_04 value, the eNodeB may interpret the NS_04 value as meaning that the first carrier is a UTR carrier. In another example, the eNodeB may determine the NS value corresponding to the first carrier by referring to a context record stored by the UE. The eNodeB may have stored the context record when establishing a radio-link-layer connection on the first carrier or at another time during the attach process. The context record may include a global identifier of the first carrier as well as an NS value of the first carrier.

Furthermore, responsive to the encountering of the trigger to begin providing the carrier aggregation service, the eNodeB may then carry out certain operations. In particular, if the first carrier is a UTR carrier, the base station may initiate a handover of the UE from the first carrier to a second carrier that is a UTU carrier and then provide the UE with carrier aggregation service, using the second carrier as the primary carrier during the carrier aggregation service. On the other hand, if the first carrier is not a UTR carrier, the base station may provide the UE with the carrier aggregation service by using the first carrier as the primary carrier, rather than initiating a handover of the UE to a different carrier.

In one example, based at least on a determination by the eNodeB that the first carrier is a UTR carrier, the eNodeB may initiate a handover of the UE from the first carrier to a second carrier that is a UTU carrier. To begin with, the eNodeB may identify a second carrier that is a UTU carrier by, for example, referring to mapping data. In one implementation, the mapping data may be indicative of whether particular carriers are UTU or UTR carriers. As a particular example, the mapping data may correlate particular carriers to NS values, and the eNodeB may be configured to select a carrier corresponding to a particular NS value, such as an NS_01 value. In practice, the eNodeB may select multiple candidate carriers (e.g., multiple NS_01 carriers) to use as the second carrier, and identify a particular one of the multiple candidate carriers using other criteria, such as signal strength measurements reported by the UE, an amount of load on the candidate carriers, etc.

Upon determining the second carrier that is a UTU carrier, the eNodeB may then initiate a handover of the UE from the first carrier to the second carrier. In practice, the eNodeB may cause the handover from the first carrier to the second carrier by adjusting the UE's radio-link-layer connection. By way of example, the eNodeB may transmit to the UE an RRC connection message that specifies the second carrier on which the eNodeB will now be serving the UE, identifying the second carrier by its global identifier, for instance. The eNodeB may then also update its context record for the UE to indicate that the UE's radio-link-layer connection now encompasses the second carrier, so that the eNodeB may then engage in communication with the UE on the second carrier. And the UE may responsively update its context record to indicate that the UE's radio-link-layer connection now encompasses the second carrier, so that the UE will be prepared to engage in communication with the eNodeB on the second carrier.

In another example, the eNodeB may initiate the handover from the first carrier to the second carrier by causing the UE to engage in a cell reselection process. For instance, the eNodeB may initially determine multiple UTU carriers using one of the processes outlined above. The eNodeB may then broadcast the UTU carriers to the UEs being served by the eNodeB in a system information message, listing the UTU carriers with a higher priority than the first carrier, and the eNodeB may direct the UE to carry out a cell reselection process. As part of the process, the UE may evaluate the signal strength/quality of one or more of the UTU carriers, and select the UTU carrier having the highest signal strength/quality. The UE may then engage in an attach process to register with the eNodeB and the network on the selected UTU carrier.

In some examples, the eNodeB may initiate the handover of the UE from the first carrier to the second carrier before providing the carrier aggregation service. After the handover is completed, the eNodeB can then use the second carrier as a primary carrier during the carrier aggregation service.

Alternatively, in some examples, based at least on a determination by the eNodeB that the first carrier is a UTR carrier, the eNodeB may add the second carrier as a secondary carrier, and then switch the primary and secondary carriers, such that the primary carrier is the second carrier and the secondary carrier is the first carrier. For example, the eNodeB may add the second carrier by adjusting the UE's radio-link-layer connection. In line with the discussion above, the eNodeB may transmit to the UE an RRC connection message that specifies the second carrier that the eNodeB will be adding, identifying the second carrier by its global identifier, for instance. Then the eNodeB may subsequently transmit an RRC connection message, indicating that the primary carrier and secondary carrier will be swapped.

In practice, to provide the UE with carrier aggregation service, the eNodeB may set or adjust the carriers encompassed by the UE's radio-link-layer connection. In particular, the eNodeB may set or adjust the carriers such that the second carrier is selected as the primary carrier and one or more other carriers, whether UTU carriers or UTR carriers, are selected as secondary carriers.

By way of example, the eNodeB may transmit to the UE an RRC connection message (e.g., an initial RRC connection message, or an RRC connection reconfiguration message) that specifies the carriers on which the eNodeB will be serving the UE, identifying each carrier by its global identifier, for instance. In particular, to facilitate carrier aggregation service, the eNodeB may specify which carrier will be used as a primary carrier by designating one such carrier with a primary-carrier-specific index number, and the eNodeB may specify which other carrier(s) will be used as one or more secondary carriers by designating the carrier(s) with secondary-carrier-specific index number(s). By way of example, the communication system may be configured such that an index number of 0 (zero) designates a primary carrier, and index numbers of 1 through 7 designate secondary carriers. With this arrangement, to use the second carrier as the primary carrier, the eNodeB may therefore specify the second carrier with an index number of 0. And the eNodeB may specify one or more other carriers with index numbers of 1 through 7.

This or another process could be used to add one or more carriers to a UE's radio-link-layer connection. For example, if after the handover, the connection currently encompasses just the second carrier, the process could be used to change the connection to add one or more additional carriers (e.g., as secondary carriers) so as to facilitate carrier aggregation service.

The eNodeB may then also update its context record for the UE to indicate that the UE's radio-link-layer connection now encompasses the indicated carriers, so that the eNodeB may then engage in communication with the UE on those carriers. And the UE may responsively update its context record to indicate that the UE's radio-link-layer connection now encompasses the indicated carriers, so that the UE will be prepared to engage in communication with the eNodeB on those carriers.

During the carrier aggregation service, in some scenarios, communication of both bearer data and control signaling associated with the bearer data may occur on the primary carrier, whereas only communication of bearer data may occur on the secondary carrier(s). By way of example, the eNodeB may use cross-carrier scheduling to transmit to the UE on a PDCCH of only the primary carrier one or more DCI messages that specify an allocation of PDSCH resources on both the primary carrier and at least one secondary carrier, and the eNodeB may communicate the bearer data on the allocated resources. There are other types of control signaling as well, such as control signaling carried on a Physical Hybrid ARQ Indicator Channel (PHICH) of the PCell. In other scenarios, is possible, however, for control signaling to occur on a PDCCH (or other control channel) of the primary carrier, as well as on a PDCCH (or other control channel) of at least one secondary carrier.

Conversely, in another example, based at least on a determination by the eNodeB that the first carrier is a UTU carrier, the eNodeB may provide the carrier aggregation service to the UE without initiating a handover of the UE to another carrier. In line with the discussion above, the eNodeB may, for example, transmit to the UE an RRC connection message (e.g., an initial RRC connection message, or an RRC connection reconfiguration message) that specifies the carriers on which the eNodeB will be serving the UE. And the message may designate one such carrier (e.g., the first carrier) with a primary-carrier-specific index number, and designate one or more other carrier(s) with secondary-carrier-specific index number(s).

Figure 2:
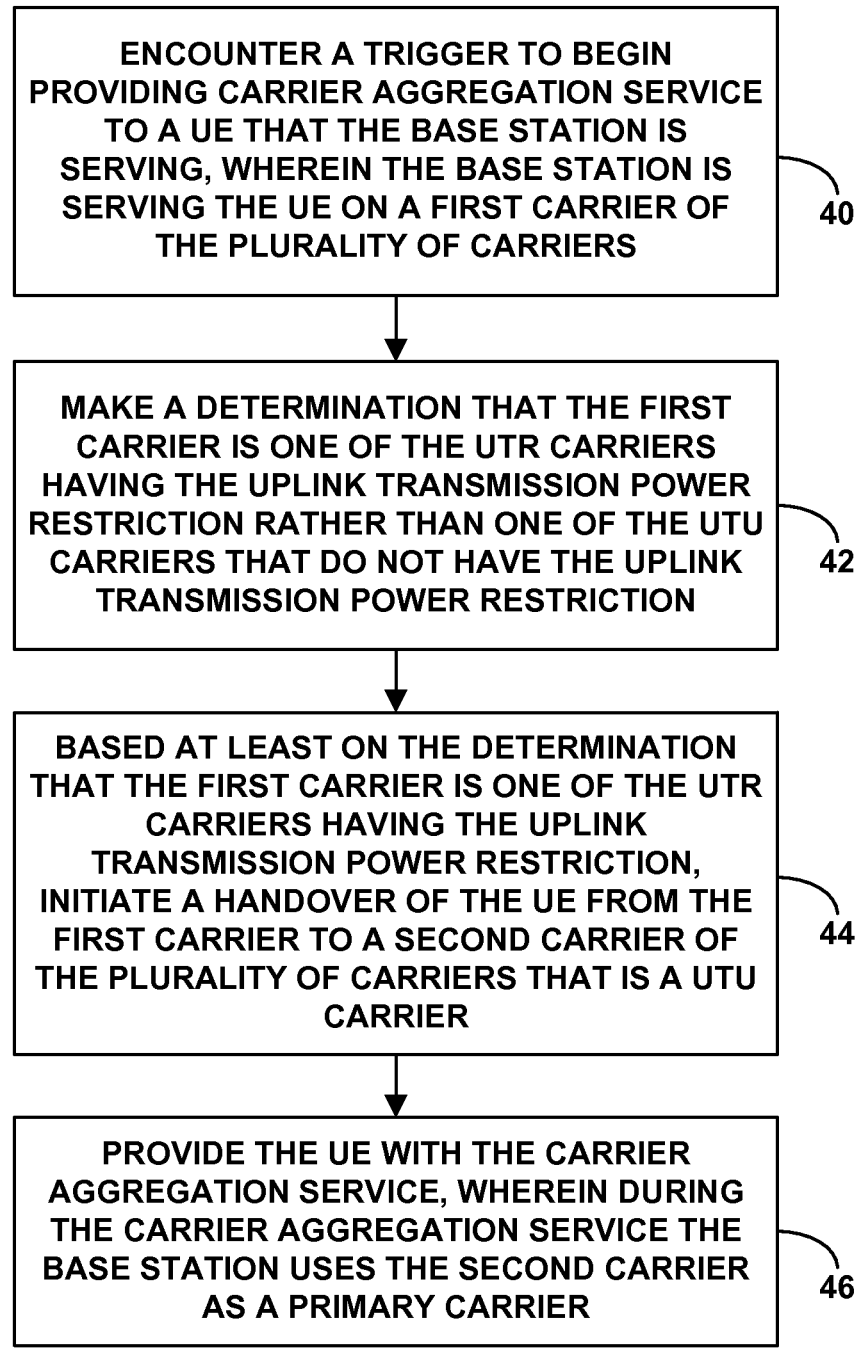
FIG. 2 is a flow chart depicting example operations in accordance with the disclosure.

FIG. 2 is next a flow chart depicting operations that can be carried out by a base station such as eNodeB 12 that provides a coverage area in which to serve UEs. In line with the discussion above, the coverage area may operate on a plurality of carriers each defining one or more ranges of frequency spectrum. Further, one or more particular carriers of the plurality of carriers may be UTR carriers having an uplink transmission power restriction and other carriers of the plurality of carriers may be UTU carriers that do not have an uplink transmission power restriction.

As shown in FIG. 2, at block 40, the base station encounters a trigger to begin providing carrier aggregation service to a UE that the base station is serving, and the base station is serving the UE on a first carrier of the plurality of carriers. At block 42, the base station makes a determination that the first carrier is one of the UTR carriers having the uplink transmission power restriction rather than one of the UTU carriers that do not have the uplink transmission power restriction. At block 44, based at least on the determination that the first carrier is one of the UTR carriers having the uplink transmission power restriction, the base station initiates a handover of the UE from the first carrier to a second carrier of the plurality of carriers that is a UTU carrier. And at block 46, the base station provides the UE with the carrier aggregation service, and during the carrier aggregation service, the base station uses the second carrier as a primary carrier. Various other features described above could be incorporated into this method as well.

Figure 3:
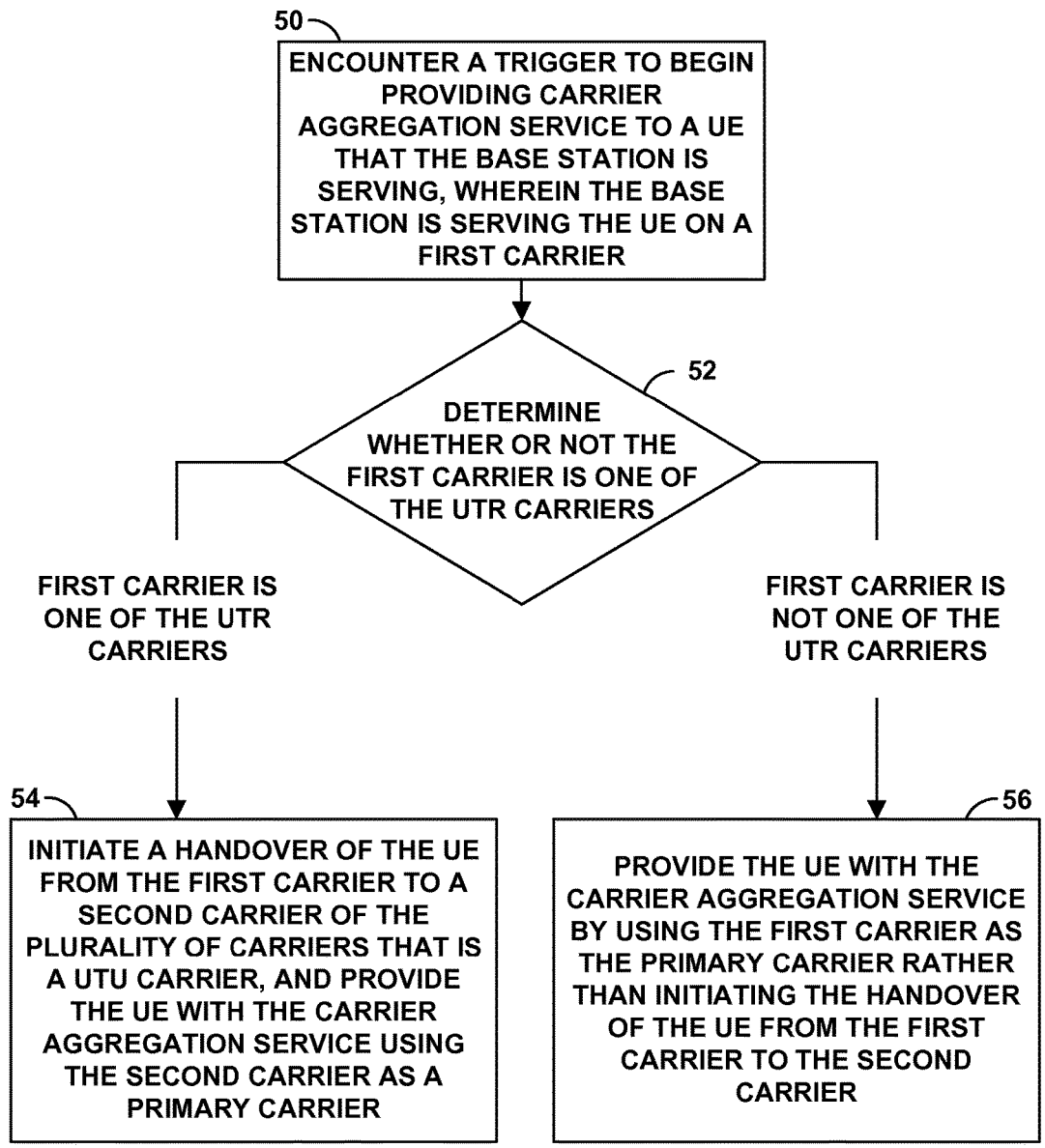
FIG. 3 is another flow chart depicting example operations in accordance with the disclosure.

FIG. 3 is next a flow chart depicting operations that can be carried out by a base station such as eNodeB 12 that provides a coverage area in which to serve UEs. In line with the discussion above, the coverage area may operate on a plurality of carriers each defining one or more ranges of frequency spectrum. Further, one or more particular carriers of the plurality of carriers may be UTR carriers having an uplink transmission power restriction and other carriers of the plurality of carriers may be UTU carriers that do not have an uplink transmission power restriction.

As shown in FIG. 3, at block 50, the base station encounters a trigger to begin providing carrier aggregation service to a UE that the base station is serving, and the base station is serving the UE on a first carrier of the plurality of carriers. At block 52, the base station determines whether or not the first carrier is one of the UTR carriers.

And at blocks 54 and 56, the base station then performs certain operations based on whether or not the first carrier is one of the UTR carriers. In particular, if the first carrier is one of the UTR carriers, then, at block 54, the base station initiates a handover of the UE from the first carrier to a second carrier of the plurality of carriers that is a UTU carrier, and provides the UE with the carrier aggregation service using the second carrier as a primary carrier. Whereas, if the first carrier is not one of the UTR carriers, then, at block 56, the base station provides the UE with the carrier aggregation service by using the first carrier as the primary carrier rather than initiating the handover of the UE from the first carrier to the second carrier.

Figure 4:
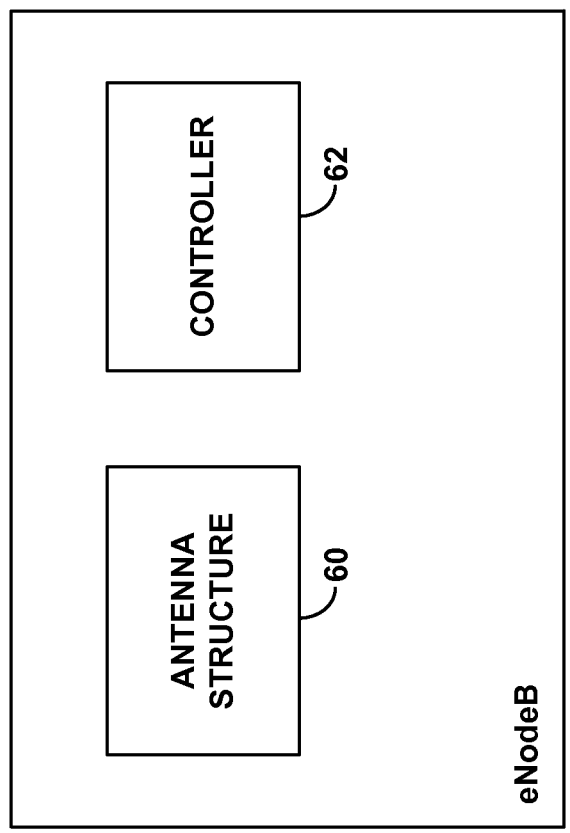
FIG. 4 is a simplified block diagram of an example base station operable in accordance with the disclosure.

Finally, FIG. 4 is a simplified block diagram of an example eNodeB (e.g., macro eNodeB, small cell, or other type of base station), showing some of the components that such a device may include in order to carry out these and other operations. As shown, the example eNodeB includes an antenna structure 60 that radiates to define an air interface coverage area for serving UEs, where the coverage area operates on a plurality of carriers. Further, the example base station includes a controller 62 that manages wireless communication via the antenna structure.

In practice, for instance, the controller 62 may include at least one processing unit, data storage, and program instructions stored in the data storage and executable by the at least one processing unit to carry out various operations described herein. Controller 62 could be implemented using hardware, software, and/or firmware. For example, controller 62 could include one or more processors and a non-transitory computer readable medium (e.g., volatile and/or non-volatile memory) that stores machine language instructions or other executable instructions. The instructions, when executed by the one or more processors, may cause controller 62, and thus the eNodeB, to carry out the various base station operations described herein.

Exemplary embodiments have been described above. Those skilled in the art will understand, however, that changes and modifications may be made to these embodiments without departing from the true scope and spirit of the invention.

We claim:

1. In a wireless communication system in which a base station provides a coverage area in which to serve user equipment devices (UEs), wherein the coverage area operates on a plurality of carriers each defining one or more ranges of frequency spectrum, and wherein one or more particular carriers of the plurality of carriers are uplink-transmission-restricted (UTR) carriers having an uplink transmission power restriction and other carriers of the plurality of carriers are uplink-transmission-unrestricted (UTU) carriers that do not have the uplink transmission power restriction, a method comprising:

encountering, by the base station, a trigger to begin providing carrier aggregation service to a UE that the base station is serving, wherein the base station is serving the UE on a first carrier of the plurality of carriers;

making a determination, by the base station, that the first carrier is one of the UTR carriers having the uplink transmission power restriction rather than one of the UTU carriers that do not have the uplink transmission power restriction; and responsive to the encountering of the trigger:
based at least on the determination that the first carrier is one of the UTR carriers having the uplink transmission power restriction, initiating, by the base station, a handover of the UE from the first carrier to a second carrier of the plurality of carriers that is a UTU carrier, and providing, by the base station, the UE with the carrier aggregation service, wherein during the carrier aggregation service the base station uses the second carrier as a primary carrier.

2. The method of claim 1, wherein during the carrier aggregation service, control signaling for communications on both the primary carrier and at least one secondary carrier occurs on the primary carrier.

3. The method of claim 1, wherein each carrier of the plurality of carriers corresponds to a respective network signaling (NS) value that encodes a respective attenuation amount, wherein the first carrier corresponds to a particular NS value, and wherein making the determination that the first carrier is one of the UTR carriers having the uplink transmission power restriction rather than one of the UTU carriers that do not have the uplink transmission power restriction comprises determining that the particular NS value encodes a respective attenuation amount that is greater than zero.

4. The method of claim 3, wherein the base station comprises a Long Term Evolution (LTE) eNodeB, and wherein the particular NS value comprises an NS_04 value.

5. The method of claim 1, wherein encountering the trigger to begin providing carrier aggregation service to the UE comprises receiving bearer data for transmission between the base station and the UE.

6. The method of claim 1, wherein encountering the trigger to begin providing carrier aggregation service to the UE comprises determining that the first carrier is threshold highly loaded.

7. The method of claim 1, wherein encountering the trigger to begin providing carrier aggregation service to the UE comprises determining that an amount of data buffered for transmission between the base station and the UE exceeds a threshold.

8. The method of claim 1, wherein encountering the trigger to begin providing carrier aggregation service to the UE comprises determining that the UE is configured to engage in carrier aggregation.

9. The method of claim 1, further comprising initiating the handover of the UE from the first carrier to the second carrier before providing the carrier aggregation service.

10. In a wireless communication system in which a base station provides a coverage area in which to serve user equipment devices (UEs), wherein the coverage area operates on a plurality of carriers each defining one or more ranges of frequency spectrum, and wherein one or more particular carriers of the plurality of carriers are uplink-transmission-restricted (UTR) carriers having an uplink transmission power restriction and other carriers of the plurality of carriers are uplink-transmission-unrestricted (UTU) carriers that do not have the uplink transmission power restriction, a method comprising:
   encountering, by the base station a trigger, to begin providing carrier aggregation service to a UE that the base station is serving, wherein the base station is serving the UE on a first carrier of the plurality of carriers;
   making a determination, by the base station, of whether or not the first carrier is one of the UTR carriers having the uplink transmission power restriction; and
   responsive to the encountering of the trigger:
      if the determination is that the first carrier is one of the UTR carriers having the uplink transmission power restriction, then (i) initiating, by the base station, a handover of the UE from the first carrier to a second carrier of the plurality of carriers that is a UTU carrier and (ii) providing, by the base station, the UE with the carrier aggregation service by using the second carrier as the primary carrier, and
      if the determination is that the first carrier is not one of the UTR carriers having the uplink transmission power restriction, then providing, by the base station, the UE with the carrier aggregation service by using the first carrier as the primary carrier, rather than initiating the handover of the UE from the first carrier to the second carrier.

11. The method of claim 10, wherein during the carrier aggregation service, control signaling for communications on both the primary carrier and at least one secondary carrier occurs on the primary carrier.

12. The method of claim 10, wherein each carrier of the plurality of carriers corresponds to a respective network signaling (NS) value that encodes a respective attenuation amount, wherein the first carrier corresponds to a particular NS value, and wherein making the determination of whether or not the first carrier is one of the UTR carriers having the uplink transmission power restriction comprises determining whether or not the particular NS value encodes a respective attenuation amount that is greater than zero.

13. The method of claim 12, wherein the base station comprises a Long Term Evolution (LTE) eNodeB, and wherein the particular NS value comprises an NS_04 value.

14. The method of claim 10, wherein encountering the trigger to begin providing carrier aggregation service to the UE comprises determining that the UE is configured to engage in carrier aggregation.

15. The method of claim 10, wherein encountering the trigger to begin providing carrier aggregation service to the UE comprises receiving bearer data for transmission between the base station and the UE.

16. The method of claim 10, wherein encountering the trigger to begin providing carrier aggregation service to the UE comprises determining that the first carrier is threshold highly loaded.

17. The method of claim 10, wherein if the determination is that the first carrier is one of the UTR carriers having the uplink transmission power restriction, the method comprises initiating the handover of the UE from the first carrier to the second carrier before providing the carrier aggregation service.

18. A base station comprising:
   an antenna structure that radiates to define a coverage area for serving user equipment devices (UEs), wherein the coverage area operates on a plurality of carriers each defining one or more ranges of frequency spectrum, and wherein one or more particular carriers of the plurality of carriers are uplink-transmission-restricted (UTR) carriers having an uplink transmission power restriction and other carriers of the plurality of carriers are uplink-transmission-unrestricted (UTU) carriers that do not have the uplink transmission power restriction; and
   a controller comprising at least one processing unit, data storage, and program instructions stored in the data storage and executable by the processing unit to carry out operations comprising:
      encountering a trigger to begin providing carrier aggregation service to a UE that the base station is serving, wherein the base station is serving the UE on a first carrier of the plurality of carriers,
      making a determination that the first carrier is one of the UTR carriers having the uplink transmission power restriction rather than one of the UTU carriers that do not have the uplink transmission power restriction, and
      responsive to the encountering of the trigger: (i) based at least on the determination that the first carrier is one of the UTR carriers having the uplink transmission power restriction, transitioning the UE to being served on a second carrier of the plurality of carriers that is a UTU carrier; and (ii) providing the UE with the carrier aggregation service, wherein during the carrier aggregation the base station uses the second carrier as a primary carrier.

19. The base station of claim 18, wherein each carrier of the plurality of carriers corresponds to a respective network signaling (NS) value that encodes a respective attenuation amount, wherein the second carrier corresponds to a particular NS value, and wherein the particular NS value encodes an attenuation amount of zero.

20. The base station of claim 18, wherein the transitioning the UE to being served on the second carrier comprises:
   adding the second carrier as a secondary carrier; and
   switching the primary carrier and the secondary carrier, such that the second carrier becomes the primary carrier and the first carrier becomes the secondary carrier.

* * * * *